US010926598B2

(12) United States Patent
Kieffer et al.

(10) Patent No.: US 10,926,598 B2
(45) Date of Patent: Feb. 23, 2021

(54) TOP SUSPENSION MOUNT COMPRISING A SECURING ELEMENT IN RELATION TO A VEHICLE BODY, ASSEMBLY COMPRISING SUCH A MOUNT, AND PROCESS FOR JOINING SUCH A MOUNT TO A VEHICLE BODY

(71) Applicant: Vibracoustic Nantes SAS, Carquefou (FR)

(72) Inventors: Jérôme Kieffer, Nantes (FR); Gerard Poindessault, Port-Saint-Pere (FR)

(73) Assignee: Vibracoustic Nantes SAS, Carquefou (FR)

( * ) Notice: Subject to any disclaimer, the term of this patent is extended or adjusted under 35 U.S.C. 154(b) by 34 days.

(21) Appl. No.: 16/322,602

(22) PCT Filed: Jul. 20, 2017

(86) PCT No.: PCT/EP2017/068389
§ 371 (c)(1),
(2) Date: Feb. 1, 2019

(87) PCT Pub. No.: WO2018/024500
PCT Pub. Date: Feb. 8, 2018

(65) Prior Publication Data
US 2019/0176556 A1 Jun. 13, 2019

(30) Foreign Application Priority Data
Aug. 3, 2016 (FR) .................................. 16 57532

(51) Int. Cl.
*B60G 13/00* (2006.01)
*F16F 9/54* (2006.01)

(52) U.S. Cl.
CPC .............. *B60G 13/003* (2013.01); *F16F 9/54* (2013.01); *B60G 2204/128* (2013.01);
(Continued)

(58) Field of Classification Search
CPC .......... B60G 13/003; B60G 2206/7104; B60G 2206/8209; B60G 2204/128;
(Continued)

(56) References Cited

U.S. PATENT DOCUMENTS 5,158,269 A * 10/1992 Hein .................... B60G 13/003
267/220
5,261,659 A * 11/1993 Tierney .............. A63B 69/0002
473/457

(Continued)

FOREIGN PATENT DOCUMENTS

EP          1439320 A1 *  7/2004  ........... B60G 15/068

OTHER PUBLICATIONS

International Search Report PCT/EP2017/068389, dated Oct. 13, 2017.

*Primary Examiner* — Darlene P Condra
(74) *Attorney, Agent, or Firm* — Fishman Stewart PLLC

(57) ABSTRACT

Vehicle top suspension mount comprising an anti-vibratory block housed in casing. The casing may comprise at least one securing element movable between an assembly position and a securing position. The securing element may be configured to block, in the securing position, the vehicle top suspension mount in relation to a vehicle body when the vehicle top suspension mount is joined to said vehicle body.

9 Claims, 4 Drawing Sheets

(52) U.S. Cl.
CPC .. *B60G 2206/7104* (2013.01); *B60G 2206/73* (2013.01); *B60G 2206/8209* (2013.01); *B60G 2206/91* (2013.01); *F16F 2224/025* (2013.01); *F16F 2226/044* (2013.01); *F16F 2230/0005* (2013.01)

(58) Field of Classification Search
CPC ... B60G 2206/73; B60G 2206/91; F16F 9/54; F16F 2226/044; F16F 2230/0005; F16F 2224/025
See application file for complete search history.

(56) References Cited

U.S. PATENT DOCUMENTS

| | | | |
|---|---|---|---|
| 7,314,224 B2 * | 1/2008 | Schuyten | B60G 3/14 280/124.147 |
| 2009/0315292 A1 * | 12/2009 | Winocur | B60G 15/068 280/124.146 |
| 2017/0291464 A1 * | 10/2017 | Isaac | B60G 13/003 |

* cited by examiner

TOP SUSPENSION MOUNT COMPRISING A SECURING ELEMENT IN RELATION TO A VEHICLE BODY, ASSEMBLY COMPRISING SUCH A MOUNT, AND PROCESS FOR JOINING SUCH A MOUNT TO A VEHICLE BODY

CROSS-REFERENCE TO RELATED APPLICATIONS

This application is a National Stage Patent Application of International Patent Application No. PCT/EP2017/068389, filed Jul. 20, 2017, which claims the benefit of French Application Serial No. 1657532, filed Aug. 3, 2016, the contents of each are incorporated by reference in their entireties.

TECHNICAL FIELD

The invention relates to the field of anti-vibratory devices for vehicles, and more particularly a top suspension mount, an assembly comprising such a mount and a shock absorber, as well as a process for mounting such a top suspension mount on a vehicle body.

BACKGROUND

The vehicle top suspension mounts known are fastened to a vehicle by means of at least two screws or bolts. Hence sufficient clearance must be provided around these known mounts in order to allow access for machine-tools for the carrying out of this screwing. This implies a strong constraint both at the level of the design of the upper suspension supports and of the vehicle body, while the screwing operation takes up a certain time, slowing down assembly of the vehicle. There is therefore a need in this direction.

SUMMARY

The present disclosure relates to a vehicle top suspension mount.

One embodiment relates to a vehicle top suspension mount comprising an anti-vibratory block housed in a casing, the casing comprising at least one movable securing element between an assembly position and a securing position, the securing element being configured to secure, in the securing position, the vehicle top suspension mount in relation to a vehicle body when the vehicle top suspension mount is joined to a vehicle body.

It is hence understood that there is one securing element or there are several securing elements. Thereafter, unless stated otherwise, by "securing element" "at least one securing element" is understood.

The securing element is an element that is deformable in relation to the rest of the casing (i.e. the rigidity of which is at least ten times less than the rigidity of the rest of the casing) so that in the assembly position the securing element permits the joining of the top suspension mount to a vehicle body, for example by inserting said mount in a housing provided for this purpose, while in the securing position the securing element works together with the vehicle body in such a way that it opposes the removal of said mount relative to the vehicle body.

Of course, the securing element can be a latching element, for example a latching tongue, that is to say, an element that is naturally in a securing position, but which deforms thanks to its natural elasticity towards the assembly position during the mounting of the top suspension mount onto a vehicle body in order to regain its securing position when the top suspension mount is in position on the vehicle body.

The securing element can also be an element that is naturally in the assembly position and which only takes up its locking position when a movement is imposed on it. In other words, in this case, the securing position is the position of the securing element when it is moved. Such a configuration provides the advantage of promoting the movement of the top suspension mount of the vehicle body on which it is mounted. Indeed, as soon as the movement imposed on the securing element is suppressed, the latter returns naturally to the assembly position thanks to its natural elasticity so that the top suspension mount can easily be removed from the vehicle body.

According to another configuration, the securing element is movable between the securing position and the assembly position, naturally remains in the position where it is at any given moment, and must be moved voluntarily to be brought from one position to the other position. For example, a plastic deformation is imposed on the securing element to bring it from one position to the other position.

Thus, such a vehicle top suspension amount does not necessitate any external fastening means in order to be fastened to a vehicle body. This facilitates assembly operations with a vehicle body and provides greater freedom of design for the part of the vehicle body receiving the top suspension mount. Indeed, it is not necessary to provide sufficient clearance to gain access to the top suspension mount with the help of a machine-tool for its fastening. We can therefore mount the top suspension mount in a more confined space than the necessary space known for mounting a top suspension mount. What is more, the mounting of such a top suspension mount is faster than the mounting of the known top suspension mounts because the screwing operation is avoided.

In certain embodiments, the securing element comprises a tongue.

It is therefore understood that when there are several securing elements, there are several tongues.

A tongue is an element easily movable between two different positions, while presenting a reduced size. Otherwise, a tongue provides good mechanical resistance, especially to buckling, in relation to the forces orientated in the axial direction of the tongue towards the proximal end of the tongue. Moreover, a tongue has a simple structure, easy to produce and easy to implement in order to achieve the assembly of the top mount to a vehicle body. Consequently, a tongue is particularly well suited to forming a securing element for a vehicle top suspension mount produced and implemented on an industrial scale.

In certain embodiments, the securing element is configured to cooperate with a vehicle body.

In other words, the securing element provides a portion providing a shape, a material and/or a resistance suited to cooperating directly with the vehicle body. This makes it possible to promote the assembly operations even more, no intermediate element being necessary between the securing element and the body.

In certain embodiments, the casing has a shoulder configured to cooperate as a support with the vehicle body in a first direction, the securing element being configured to secure the vehicle top suspension mount in relation to the vehicle body in a second direction opposite the first direction.

It is therefore understood that the shoulder blocks the top suspension mount in relation to the vehicle body in a first direction while the securing element blocks the top suspension mount in relation to the vehicle body in the opposite direction. Thus, to mount the top suspension mount onto the vehicle body, the mount is inserted in the housing provided for that purpose until the shoulder cooperates as a stop with the vehicle body, then the securing element is positioned in the securing position, as a result of which the top suspension mount is locked onto the vehicle body. Such an assembly structure is particularly easy to implement, effective and reliable.

In certain embodiments, the vehicle top suspension mount comprises a removable insert configured to bring the securing element from the assembly position towards the securing position and to lock the securing element in the securing position.

It is understood that the removable insert is a distinct part of the anti-vibratory block and of the casing, and which is inserted into the assembly formed by the anti-vibratory block and the casing being able to be removed. For example, the insert is force-fitted.

It is thus understood that when the insert is mounted, the securing element is taken from the assembly position towards the securing position, and by remaining in position, the insert blocks the securing element in the securing position. Inversely, when the insert is removed, the constraint imposed on the securing element is suppressed so that the securing element can return to the assembly position. For example, the securing element is naturally in the assembly position so that when the insert is removed the securing element returns to the assembly position by itself thanks to its elasticity.

Such a configuration is particularly simple to implement, so that the assembly and fastening of the top suspension mount to a vehicle body is particularly easy.

Of course, according to one variant, the securing element is brought into the securing position by other means, for example by being moved voluntarily or thanks to its elasticity if the securing position is its natural position while the insert is only configured to block the securing element in the securing position.

In certain embodiments, the casing provides a peripheral wall, the securing element comprising a tongue provided in the peripheral wall, the removable insert comprising a finger configured to move and block the tongue towards the outside of the peripheral wall.

It is thus understood that when there are several securing elements, there are several tongues. It is likewise understood that there are at least as many fingers as tongues. Of course, the shape of the fingers is not limited.

It is thus understood that in the securing position the tongue projects towards the outside of the peripheral wall in such a manner as to form a retaining hook working together with the vehicle body. Of course, in the assembly position the tongue can project towards the outside of the peripheral wall while in the securing position the tongue projects towards the outside of the peripheral wall beyond the assembly position.

Such a configuration permits particularly easy joining of the top suspension mount to a vehicle body and very easy and effective locking.

The present presentation likewise relates to an assembly comprising a vehicle top suspension mount and a shock absorber.

One embodiment relates to an assembly comprising a vehicle top suspension mount such as described in the present description joined to a shock absorber, with a jounce bumper being arranged between the shock absorber and the removable insert.

It is of course understood that the jounce bumper is a distinct element of the shock absorber. For example, the jounce bumper is mounted on the shock absorber rod, between the body of the shock absorber and the top suspension mount. Such an assembly forms all or part of a vehicle support strut and is ready to be mounted on a vehicle body. Indeed, in order to mount this assembly onto a vehicle body, it is sufficient to introduce the top suspension mount into the housing provided for this purpose in the vehicle body, and to push the shock absorber, as a result of which the removable insert is likewise pushed by means of the jounce bumper, which makes the securing element move from the assembly position to the securing position and locks the securing element in the securing position.

The present description also relates to an assembly process for a vehicle top suspension mount with a car body.

One embodiment relates to an assembly process for a vehicle top suspension mount such as described in the present description with a vehicle body, comprising the steps of placing the securing element in the assembly position or of leaving the securing element free to move towards the assembly position, of inserting the casing in a housing in the vehicle body provided for this purpose, and of positioning the securing element in the securing position so that the securing element cooperates with the vehicle body.

It is therefore understood that before joining the top suspension mount to the vehicle body, either the securing element is left free if the latter is naturally in the securing position, so that it can move into the assembly position in the course of the insertion of the mount into the housing in the body provided for this purpose, or the securing element is left in the assembly position if it is naturally in this position, or it is brought into the assembly position if it requires to be moved in order to be taken from one position to the other position.

Also, in order to position the securing element in the securing position, either the securing element is left as it is if the latter is naturally in the securing position, or the securing element is moved to the securing position if the latter is naturally in the assembly position or if it needs to be moved in order to be taken from one position to the other position.

In certain embodiments, the securing element is positioned and locked in the securing position with the help of the removable insert.

In certain embodiments, a shock absorber is fastened to the vehicle top suspension mount, the removable insert being inserted into the casing by pressing the shock absorber in the direction of insertion.

Of course, the shock absorber cooperates directly or indirectly with the insert, for example by means of a jounce bumper.

BRIEF DESCRIPTION OF THE DRAWINGS

The invention and its advantages will be better understood after the reading of the detailed description provided below of different embodiments of the invention given as non-limiting examples. This description refers to the pages of annexed figures, on which.

DETAILED DESCRIPTION

Figure 1:
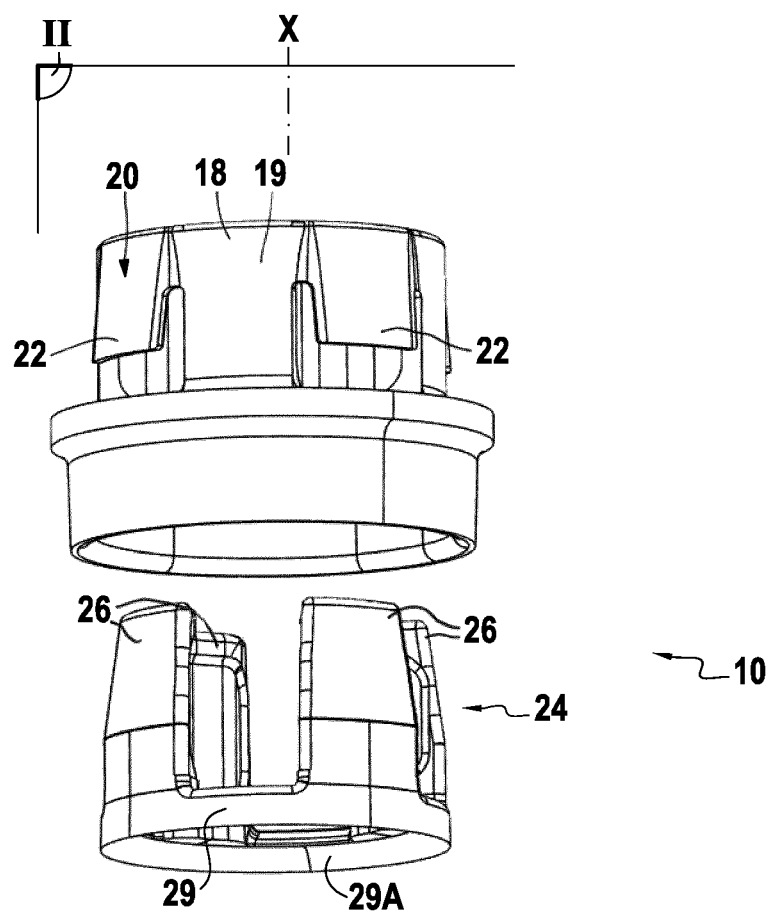
FIG. 1 shows a perspective view of a vehicle upper suspension support, the removable insert approaching the assembly comprising the casing and the anti-vibratory block.
Figure 2:
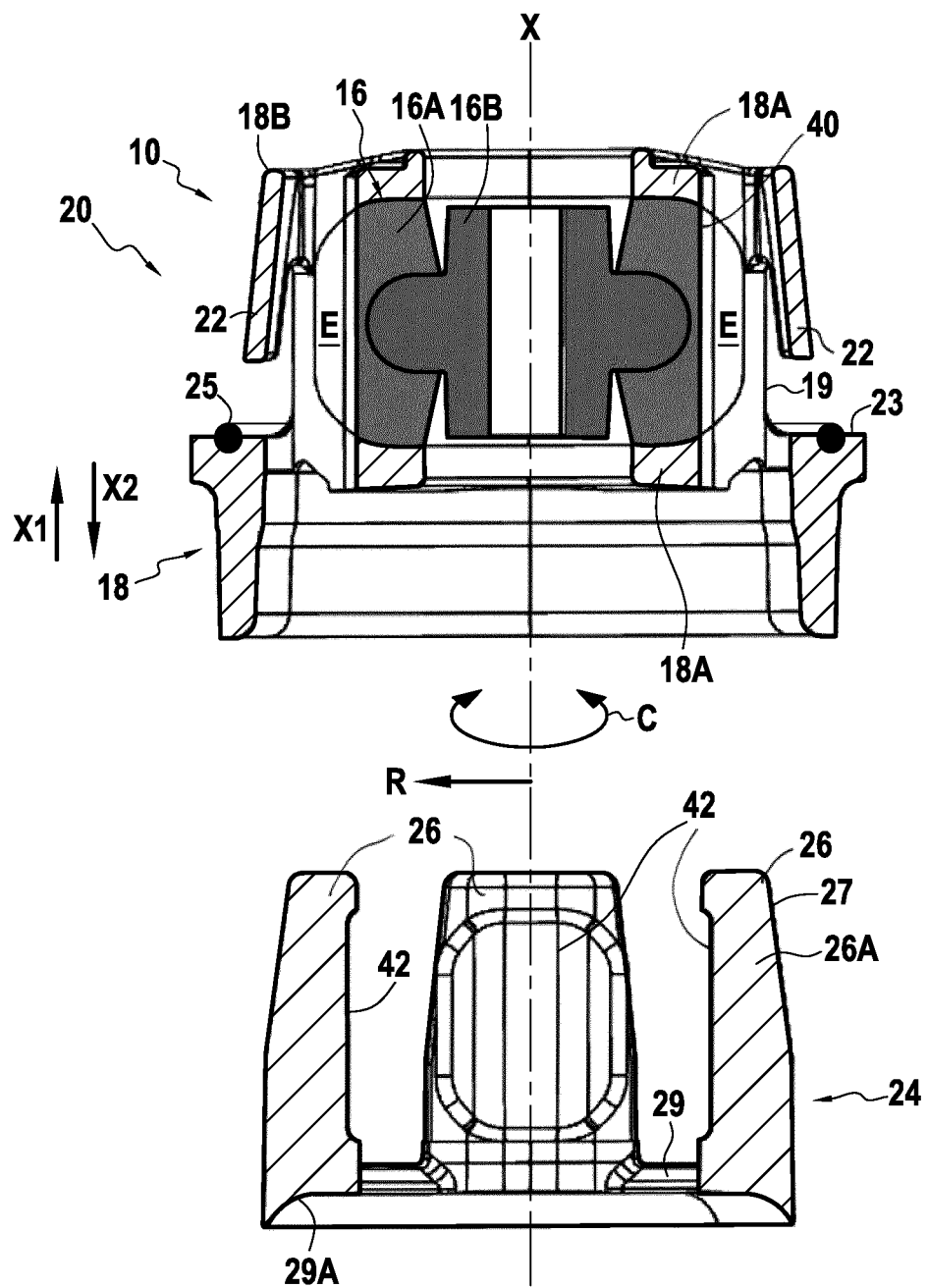
FIG. 2 shows the vehicle top suspension mount seen according to sectional drawing II of FIG. 1, FIGS. 3A to 3C show three phases in the course of joining the vehicle top suspension mount mounted on a shock absorber, to a vehicle body.

FIGS. 1 and 2 show a vehicle top suspension mount 10 seen in perspective and in section respectively, where the removable insert 24 is not inserted into assembly 20 formed by casing 18 and anti-vibratory block 16

Anti-vibratory block 16 comprises an elastomeric body 16A having a first contact surface 40 and a ring 16B configured so as to be joined to a shock absorber rod, this ring 16B having a rotationally symmetrical shape extending along an axis X. More generally, the anti-vibratory block 16 extends in axial direction X. First contact surface 40 likewise extends in axial direction X. Of course, elastomeric body 16A is more flexible than ring 16B so as to deform flexibly and to damp the vibrations sustained by ring 16B so that these vibrations are not transmitted, wholly or partly, to casing 18. For example, ring 16B is made of metal or polymeric material. For manufacture of the anti-vibratory block 16, the elastomeric body 16A is over-moulded around the ring 16B.

Casing 18 is made of polymeric materials and over-moulded around anti-vibratory block 16. Thus, assembly 20 formed by anti-vibratory block 16 and by casing 18 forms a single piece. A space E is arranged opposite the first contact surface 40. Casing 18 has an annular shape of axis X. In particular, the casing has an internal portion 18A which encloses anti-vibratory block 16 on both sides in axial direction X. In other words, anti-vibratory block 16 is sandwiched in an axial direction X by internal portion 18A of casing 18.

Of course, and this broadly speaking, a radial direction R is a direction perpendicular to axis X. The azimuthal or circumferential direction C corresponds to the direction describing a ring around the axial direction X. The three directions axial X, radial R and azimuthal C correspond to the direction defined by the elevation, the radius and the angle respectively in a cylindrical coordinate system. Finally, unless otherwise stated, the adjectives "internal" and "external" are used with reference to a radial direction R so that the interior part (i.e. radially interior) of an element is closer to axis X than the external part (i.e. radially external) of the same element.

Casing 18 has an external portion 18B having a peripheral wall 19, tongues 22 configured to cooperate with a vehicle body and each forming a securing element being arranged in the peripheral wall 19. In this example, casing 18 comprises four tongues 22. Each tongue 22 extends substantially in axial direction X in assembly position (that is to say forming an angle lower than 30° to the axial direction). Each tongue 22 is movable between an assembly position, the position shown in FIGS. 1, 2, 3A and 3B, and a securing position, the position shown in FIGS. 3C and 4. It is noted that in the assembly position tongues 22 project radially towards the outside of peripheral wall 19 while in the securing position tongues 22 "project even more" towards the outside of peripheral wall 19, that is to say, that they project radially towards the outside beyond the assembly position. Otherwise, in this embodiment, due to their elasticity, the natural position of tongues 22 (i.e. at rest or when they are not subject to any constraint) corresponds to the assembly position. Tongues 22 are configured to block, in the securing position, the top suspension mount 10 in relation to a vehicle body when top mount 10 is joined to a vehicle body (see FIG. 3C).

Casing 18 likewise shows a shoulder 23 configured to cooperate with a vehicle body. This shoulder 23 is annular and extends circumferentially along the whole periphery of external portion 18B of casing 18. In this embodiment, shoulder 23 comprises O-ring seal 25.

Hence, shoulder 23 is configured to cooperate with a vehicle body in a first axial direction X1 while tongues 22 are configured to cooperate as a support with the vehicle body in a second axial direction X2 opposite to the first axial direction X1.

Removable insert 24 shows an annular shape of axis X, and has as many fingers 26 as casing 18 has tongues 22, namely in this embodiment four fingers 26. Fingers 26 extend in the axial direction X from annular base 29. The insert is configured to be inserted in axial direction X into the assembly 20 formed by the anti-vibratory block 16 and the casing 18. It is noted that surface 29A of base 29 opposite to fingers 26 forms a centring fillet configured to cooperate in form-fitting manner with a jounce bumper 32 (see FIG. 4).

The internal faces of the fingers 26 form second contact surface 42 extending in axial direction X opposite and at a distance from first contact surface 40. Hence, first and second contact surfaces 40 and 42 are discontinuous. Of course, according to one variant, the first contact surface could be continuous while the second contact surface is discontinuous, or inversely. When insert 24 is inserted into assembly 20 formed by the anti-vibratory block 16 and casing 18, first contact surface 40 and second contact surface 42 are radially distant from one another by distance D (see FIG. 4).

Distal end portion 26A of fingers 26 has an inclined external surface 27 so that the distance between surface 27 and axis X decreases in axial direction X moving towards the distal end of the fingers (i.e. in axial direction X1). This inclined surface 27 is configured to cooperate as a support with tongues 22 so as to bring, upon the insertion of insert 24 into assembly 20, tongues 22 from the assembly position to the securing position, and to keep tongues 22 in the securing position. Thus, insert 24 is configured to bring tongues 22 from the assembly position to the securing position and to lock tongues 22 in the securing position.

It is noted that insert 24 is inserted into assembly 20 so that fingers 26 extend into space E, extending axially and arranged radially between external portion 18B of casing 18, on the one hand, and the anti-vibratory block 16 internal portion 18A of casing 18, on the other. Moreover, casing 18 and insert 24 are configured so that insert 24 is force-fitted into assembly 20. With space E opening on both sides of assembly 20 in axial direction X, in order to withdraw insert 24 from assembly 20 it is, for example, possible to press the distal end of fingers 26 in direction X2.

Figure 3C:
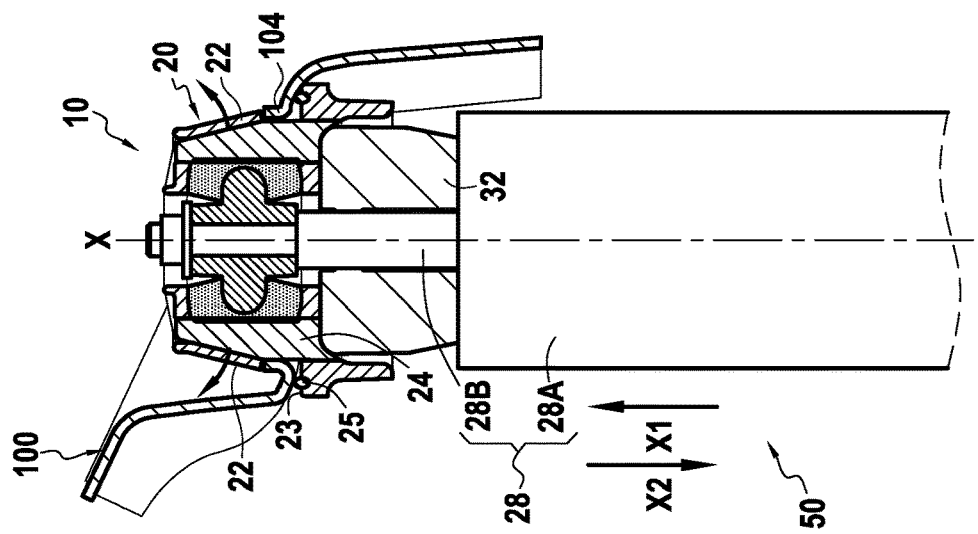
Figure 3B:
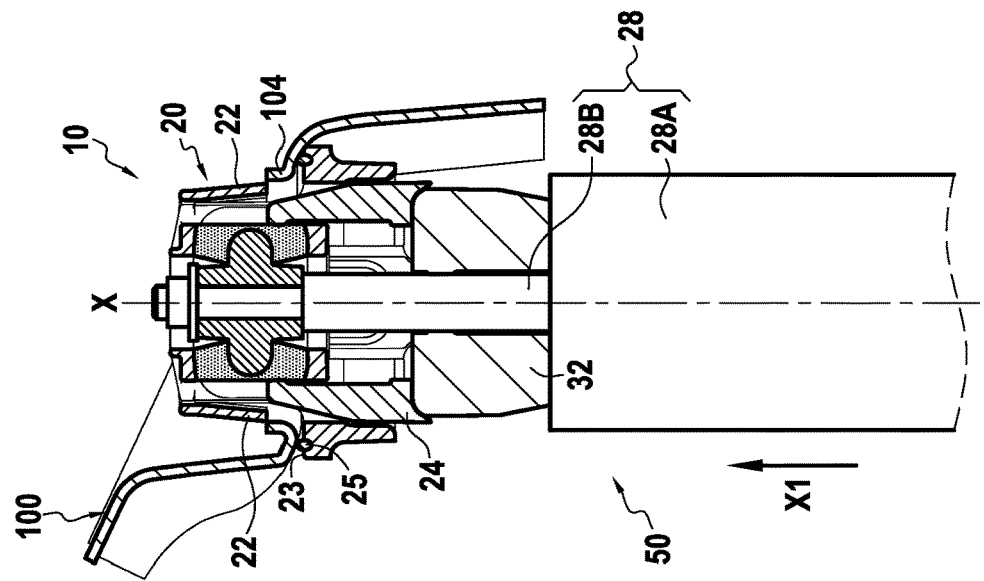
Figure 3A:
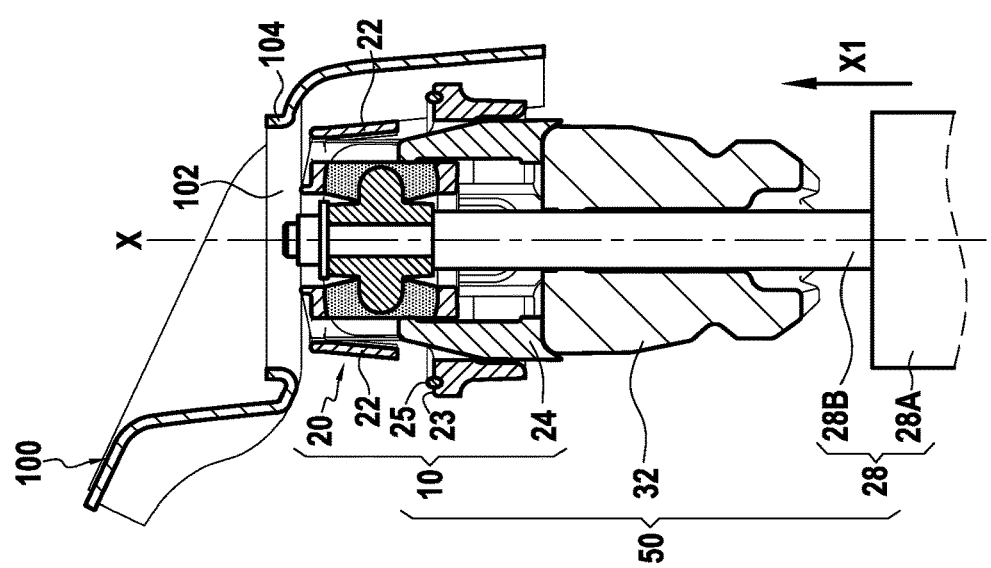

We will now describe the joining of top suspension mount 10 to a vehicle body with reference to FIGS. 3A to 3C. In this embodiment, top suspension mount 10 is part of an assembly 50 comprising furthermore shock absorber 28 and jounce bumper 32. Top suspension mount 10 is fastened to shock absorber 28, and more particularly to rod 28B of shock absorber 28 in an otherwise known manner. What is more, the jounce bumper 32 is fitted on rod 28B and arranged axially between body 28A of shock absorber 28 and removable insert 24.

In FIG. 3A, insert 24 is only partly inserted in assembly 20 formed by anti-vibratory block 16 and casing 18, so that it does not cooperate with tongues 22. Tongues 22 are thus in the assembly position.

In FIG. 3A, assembly 50 is shown opposite vehicle body 100, and top suspension mount 10 is introduced into housing 102 of body 100 provided for this purpose. Considered in the axial direction X (i.e. in the vertical direction on FIGS. 3A, 3B and 3C), assembly 20 formed by anti-vibratory block 16 and by casing 18 forms the upper part of top suspension mount 10 which is introduced first into housing 102, from below. In other words, casing 18 is inserted into housing 102. Insert 24 forms the lower part of top suspension mount 10.

Top suspension mount 10 is introduced into housing 102 in axial direction X1 until shoulder 23 cooperates as a support (directly and/or via the gasket 25) with body 100. Tongues 22 being in the assembly position, they do not disturb the introduction of top suspension mount 10 into housing 102 and do not cooperate with rim 104 of housing 102.

In FIG. 3B, shoulder 23 cooperates as a support with body 100 while tongues 22 are always in the assembly position. Pushing shock absorber 28 upwards in axial direction X1 is continued so that rod 28B sinks into body 28A and body 28A presses against jounce bumper 32. Hence insert 24 is fitted into assembly 20 with shock absorber 28 by means of jounce bumper 32 in axial direction X in the insertion direction X1.

In FIG. 3C, the insertion of insert 24 into assembly 20 was completed so that insert 24 brought tongues 22 from the assembly position to the securing position, as is symbolised by the thick-line arrows. Tongues 22 thus project more towards the outside of casing 18 than in the assembly position so that their distal ends cooperate with body 100, and more particularly in this embodiment with the shoulder formed by rim 104, and block top mount 10 in axial direction X in the direction of withdrawal of top suspension mount 10 in relation to vehicle body 100 (i.e. in direction X2). Of course, when the pressure exerted on shock absorber 28 is released, shock absorber 28 and jounce bumper 32 return to the initial position while insert 24, force-fitted in assembly 20 remains in position in assembly 20 and locks tongues 22 in the securing position.

Figure 4:
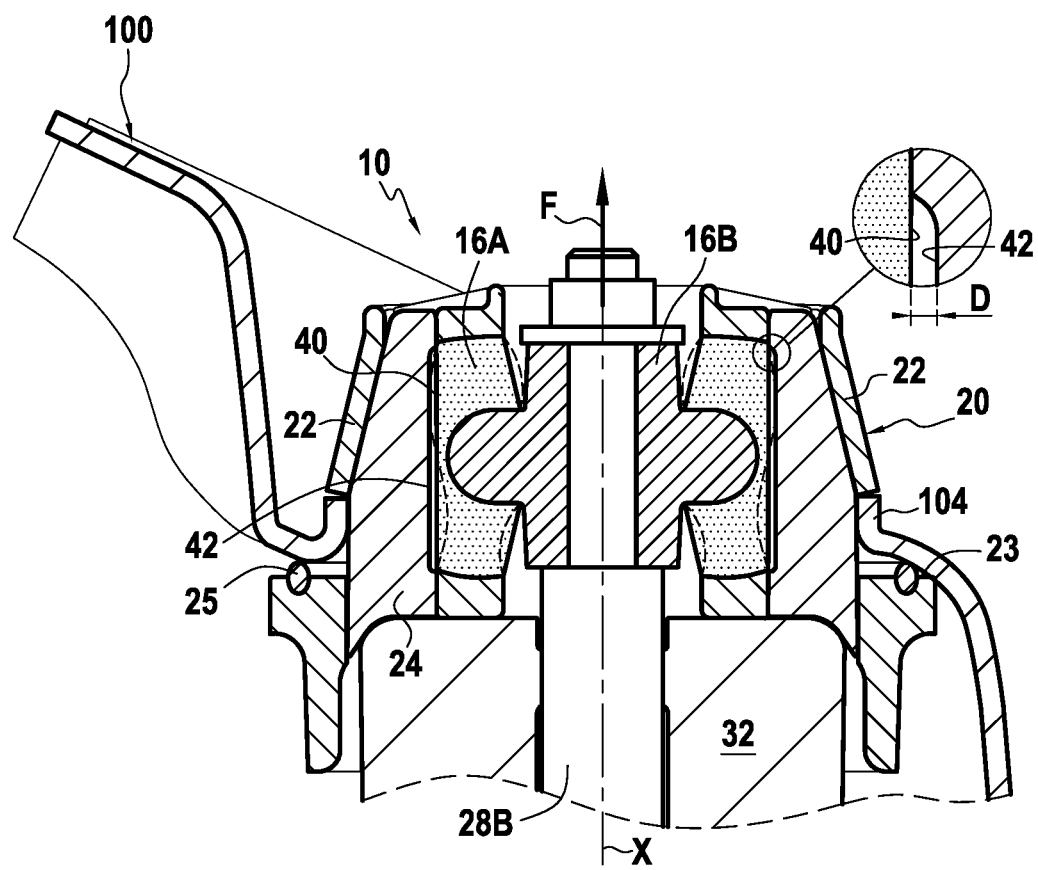
FIG. 4 shows the deformations of the elastomeric body upon axial movement of the ring.

FIG. 4 shows in more detail top suspension mount 10 joined to vehicle body 100. In this configuration, tongues 22 are in the securing position while first contact surface 40 and second contact surface 42 are opposite each other and separated from each other by distance D. When axial force F is applied by shock absorber 28 to ring 16B, so that ring 16B moves in axial direction X, the elastomeric body 16A is deformed so that first contact surface 40 cooperates at least partially as a support with second contact surface 42 in accordance with at least one deformation regime of elastomeric body 16A (i.e. in accordance with at least one deformation of elastomeric body 16A). Such a deformation regime is shown as a dashed line in FIG. 4. Thus, it is considered that the elastomeric body 16A is deformable so that first contact surface 40 cooperates at least partially as a support with second contact surface 42. Thanks to this cooperation as a support of contact surfaces 40 and 42, the amplitude of the deflection of ring 16B in axial direction X is limited.

Although the present invention has been described with reference to specific embodiments, it is obvious that modifications and changes can be made to these examples without departing from the general scope of the invention as defined by the claims. In particular, individual characteristics of the different embodiments illustrated/mentioned can be combined in additional embodiments. Consequently, the description and the drawings must be considered in an illustrative rather than restrictive sense.

It is likewise obvious that all the characteristics described with reference to a process are transposable, alone or in combination, to a device, and inversely, all the characteristics described with reference to a device are transposable, alone or in combination, to a process.

The invention claimed is:

1. Vehicle top suspension mount comprising an anti-vibratory block housed in a casing, the casing comprising at least one securing element movable between an assembly position and a securing position, wherein the at least one securing element is configured to block, in the securing position, the vehicle top suspension mount with respect to a vehicle body when the vehicle top suspension mount is joined to said vehicle body, and including a removable insert configured to bring the at least one securing element from the assembly position to the securing position and to lock the at least one securing element in the securing position.

2. Vehicle top suspension mount according to claim 1, in which the at least one securing element comprises a tongue.

3. Vehicle top suspension mount according to claim 1, in which the at least one securing element is configured to cooperate with said vehicle body.

4. Vehicle top suspension mount according to claim 1, in which the casing has a shoulder configured to cooperate as a support with said vehicle body in a first direction, and the at least one securing element is configured to block the vehicle top suspension mount with respect to said vehicle body in a second direction opposite the first direction.

5. Vehicle top suspension mount according to claim 1, in which the casing has a peripheral wall, the at least one securing element comprises a tongue arranged in the peripheral wall, and the removable insert comprises a finger configured to move and block the tongue towards the outside of the peripheral wall.

6. An assembly comprising the vehicle top suspension mount according to claim 1 assembled with a shock absorber, wherein a jounce bumper is arranged between the shock absorber and the removable insert.

7. An assembly process for assembling the vehicle top suspension mount according to claim 1 with said vehicle body, the assembly process comprising the steps of:
   placing the at least one securing element in the assembly position or leaving the at least one securing element free to move towards the assembly position,
   inserting the casing in a housing in the vehicle body, the housing configured to receive the casing, and
   positioning the securing element in the securing position so that the at least one securing element can cooperate with the vehicle body;
   wherein the at least one securing element is positioned and locked in the securing position via the removable insert.

8. Process according to claim 7, including fastening a shock absorber to the vehicle top suspension mount, and inserting the removable insert in the casing by pressing the shock absorber in an insertion direction.

9. An assembly process for assembling a vehicle top suspension mount with a vehicle body, comprising:
   providing a suspension mount including an anti-vibratory block housed in a casing, the casing comprising at least one securing element movable between an assembly position and a securing position, the at least one securing element is configured to block, in the securing position, the vehicle top suspension mount with respect to said vehicle body when the suspension mount is joined to said vehicle body, and including a removable insert configured to bring the at least one securing element from the assembly position to the securing position and to lock the at least one securing element in the securing position;

placing the at least one securing element in the assembly position or leaving the at least one securing element free to move towards the assembly position, inserting the casing in a housing in the vehicle body, the housing configured to receive the casing, and positioning and locking the at least one securing element in the securing position via the removable insert so that the at least one securing element can cooperate with the vehicle body.

\* \* \* \* \*